May 24, 1949.　　　G. L. WHITE ET AL　　　2,470,907
VEHICLE SEAT CONSTRUCTION
Filed Feb. 7, 1945　　　　　　　　　　　　2 Sheets-Sheet 1
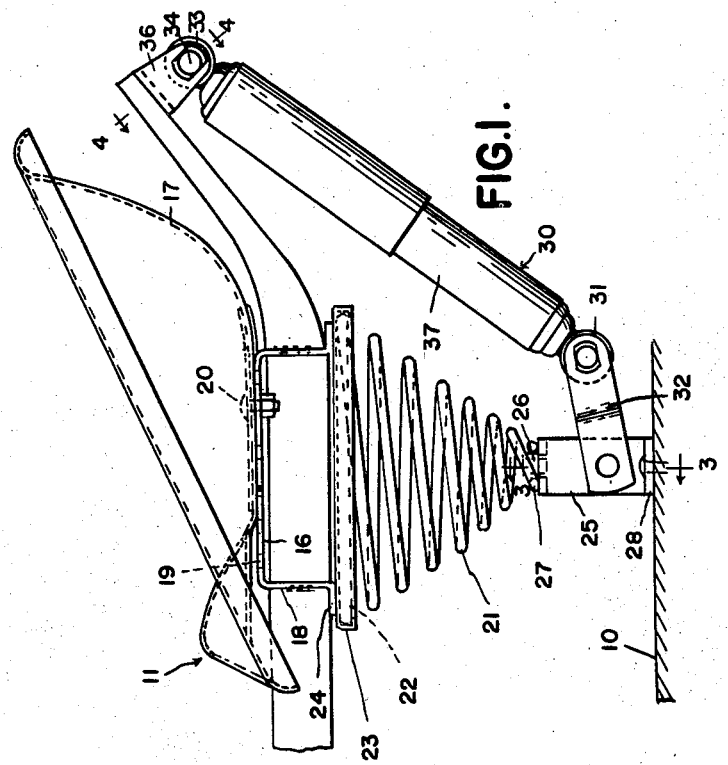
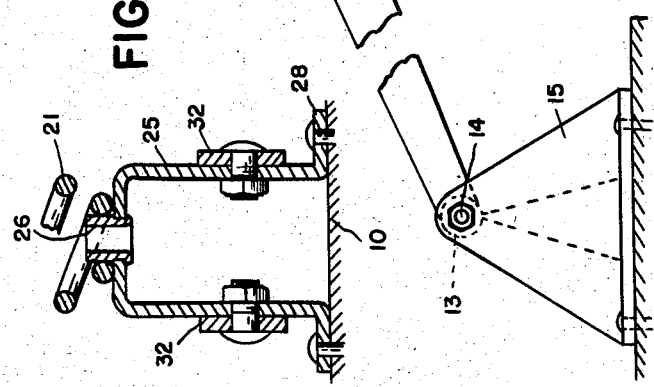
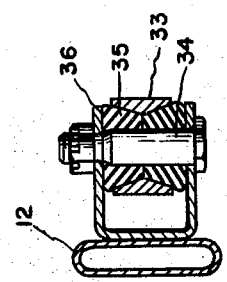
INVENTORS
GLEN L. WHITE
BY CLAYTON H. DIEDRICH
ATTORNEYS May 24, 1949.  G. L. WHITE ET AL  2,470,907
VEHICLE SEAT CONSTRUCTION
Filed Feb. 7, 1945  2 Sheets-Sheet 2
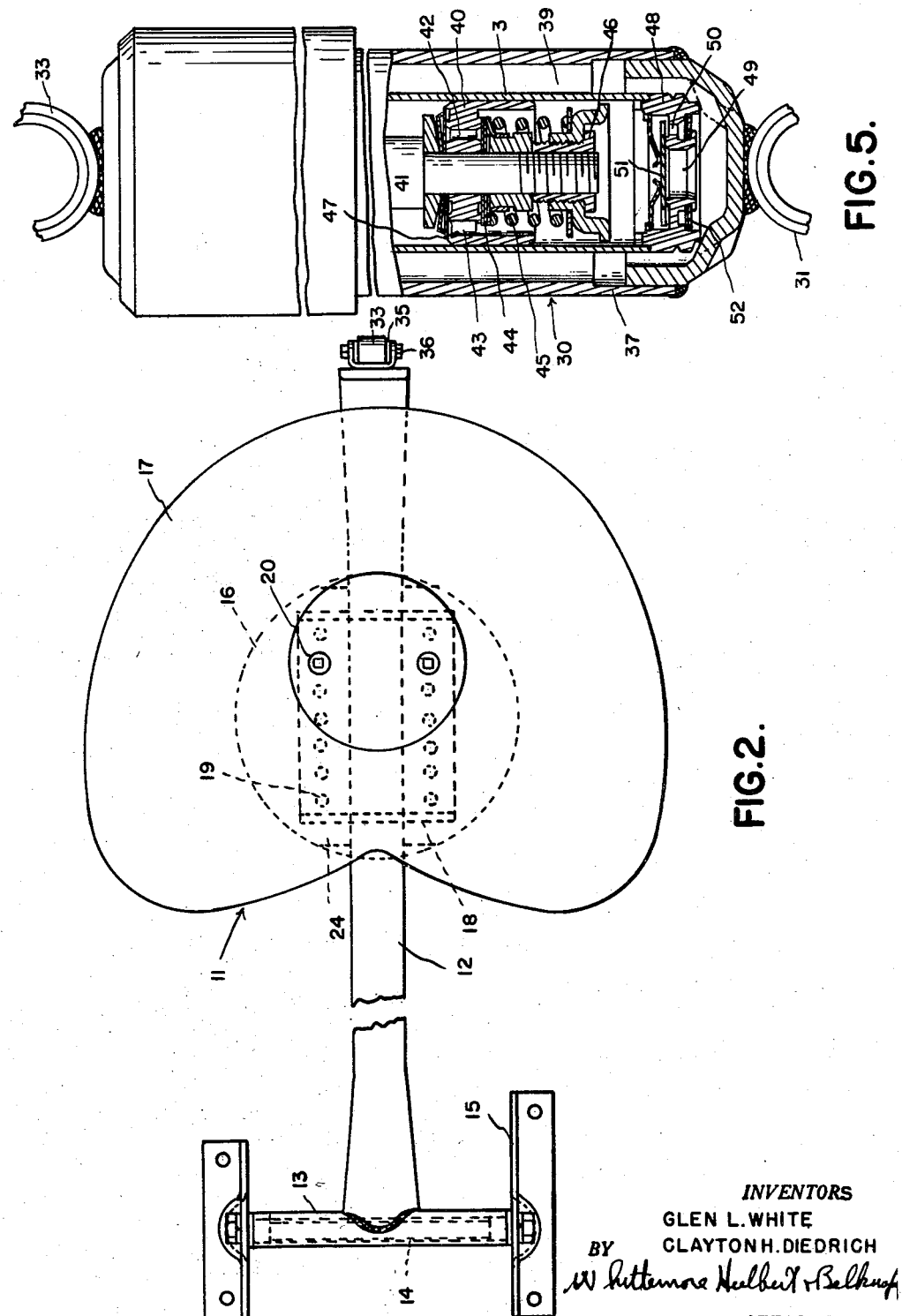
INVENTORS
GLEN L. WHITE
CLAYTON H. DIEDRICH
BY
ATTORNEYS Patented May 24, 1949

2,470,907

UNITED STATES PATENT OFFICE 2,470,907

VEHICLE SEAT CONSTRUCTION

Glen L. White, Grosse Pointe, and Clayton H. Diedrich, Monroe, Mich., assignors to Monroe Auto Equipment Company, Monroe, Mich., a corporation of Michigan Application February 7, 1945, Serial No. 576,572

9 Claims. (Cl. 155—9)

This invention relates generally to vehicle seat assemblies and refers more particularly to improvements in tractor seats.

One of the principal objects of this invention is to provide an inexpensive seat construction which adapts itself readily to mass production principles and can be easily installed on existing tractors.

Existing tractors are usually equipped with seats suspended from the tractor by leaf springs which have a more or less fixed rate and thereby do not compensate for the differences in weight of occupants of the seat. In other words, the deflection of the leaf spring is proportional to the weight on the seat and therefore the ride characteristics of the seat vary over a wide range. Moreover, suspension systems of the above general type expose the occupant of the seat to the danger of serious injury because if the springs or the spring shackles should break, the occupant is thrown from the vehicle.

The present invention overcomes the above objections by providing a suspension system embodying a variable rate coil spring for supporting the seat and having a double acting hydraulic shock absorber for controlling the action of the spring. Due to the fact that the suspension spring is of the variable rate type, it will react just as much to a heavy occupant as it does to a light-weight occupant and as a result, the riding characteristics of the seat are improved, regardless of load variations on the seat. The riding qualities are further improved by reason of the fact the the shock absorber resists or dampens sudden action of the spring caused by travel of the vehicle over rough ground. The shock absorber further serves as an emergency support for the seat in the event the spring should become broken or displaced.

The foregoing as well as other objects will be made more apparent as this description proceeds, especially when considered in connection with the accompanying drawings, wherein:

Figure 1 is a side elevation of a tractor seat assembly embodying the features of this invention;

Figure 2 is a plan view of the construction shown in Figure 1;

Figure 3 is a sectional view taken substantially on the plane indicated by the line 3—3 of Figure 1;

Figure 4 is a sectional view taken substantially on the plane indicated by the line 4—4 of Figure 1; and Figure 5 is a fragmentary sectional view of the shock absorber embodied in the assembly.

Referring now more in detail to the drawings, it will be noted that the reference character 10 in Figure 1 indicates a supporting part of the tractor part of the tractor and the numeral 11 designates a seat assembly on the supporting part 10. The seat assembly comprises a beam 12 which extends in the general direction of the length of the tractor and is pivotally supported at its front end to the tractor supporting part 10 for swinging movement in a substantially vertical plane.

As shown in Figure 2 of the drawings, the front end of the beam 12 is secured to a transverse tube 13 intermediate the ends of the latter. The tube 13 is journaled on a transverse tie rod 14 having the opposite ends respectively secured to the tractor supporting part 10 through the medium of brackets 15. A plate 16 is secured to the beam 12 adjacent the free or swinging end of the latter and a seat 17 is secured to the plate. The seat 17 is preferably stamped from sheet metal and is of the variety normally provided on tractors or similar vehicles.

The beam 12 is preferably of tubular cross section, although practically any other type of beam may be employed if desired. It is preferred to use a tubular type of beam, because the strength-weight ratio of tubular beams is more favorable than that of beams of other shapes. Furthermore, a tubular type beam offers substantial resistance to torsion, and accordingly, rocking movement of the seat 17 by torsional stresses is reduced to the minimum.

Referring again to Figure 1 of the drawings, it will be noted that the seat supporting plate 16 is provided with depending flanges 18 at the front and rear edges thereof. The flanges 18 are provided with aligned openings therethrough for receiving the tubular beam 12 and the latter is preferably welded to the flanges 18. As shown in Figure 2, the plate 16 is formed with a plurality of longitudinally spaced openings 19 at opposite sides of the beam. The openings 19 are adapted to selectively receive the studs 20 carried by the seat 17 and thereby provide for fore and aft adjustment of the seat relative to the beam 12.

The free or swinging end portion of the beam 12 is supported from the tractor by means of a variable rate coil spring 21 positioned directly beneath the seat 17 with the convolution 22 of greatest diameter uppermost and seated in a retainer 23. The retainer 23 is welded or otherwise permanently secured to flanges 24 which project laterally outwardly from the lower ends of the flanges 18 on the seat supporting plate 16. The lower end of the coil spring 21 is seated on the base of an inverted U-shaped bracket 25 and is held against lateral displacement relative to the bracket by means of a pilot 26 which extends upwardly from the bracket into the lowermost convolution 27 of the coil spring. The flanges forming the legs of the U-shaped bracket 25 are bent laterally outwardly to form attaching flanges 28, which in turn may be bolted to the tractor supporting part 10.

The variable rate spring previously described increases the resistance to deflection of the free end of the beam or seat 17 as the weight on the seat increases, and thereby assures proper suspension of the seat regardless of the load on the latter. It will further be noted that as the coil spring 21 is compressed, the convolutions thereof nest within one another. This feature is desirable in that it enables supporting this seat at a relatively low elevation with respect to the tractor while at the same time permitting the required spring deflection.

The action of the suspension spring 21 is controlled by a tubular direct acting hydraulic shock absorber 30 having the lower end connected to the bracket 25 and having the upper end connected to the free end of the beam 12 beyond the seat 17. As shown in Figure 1, the lower end of the shock absorber 30 is provided with a lug 31 which is suitably pivotally supported between the rear ends of a pair of arms 32 by a pin and bushings formed of rubber or some similar material. The opposite ends of the arms are bent laterally outwardly and are respectively secured to opposite sides of the bracket 25. The upper end of the shock absorber is provided with a similar lug 33 which is mounted on a pin 34 through the medium of rubber bushings 35. The pin 34 is carried by a U-shaped bracket 36 having the base portion welded or otherwise permanently attached to the free end of the beam 25, which has been flattened to provide an extended bearing contact for the bracket 36.

The shock absorber selected for the purpose of illustrating this invention is shown more in detail in Figure 5, although it will be understood that other types of tubular shock absorbers may be used if desired. As shown in Figure 5, the shock absorber 30 comprises a tubular casing 37 and a cylinder 38 supported within the casing in concentric relation to the latter. The external diameter of the cylinder is sufficiently less than the internal diameter of the casing to form an annular reserve chamber 39 for a hydraulic fluid medium. A piston 40 is reciprocably mounted in the cylinder 38 and is connected to the lug 33 by means of a rod 41.

In accordance with conventional practice, fluid is permitted to flow in opposite directions through the piston 40 as the latter reciprocates in the cylinder 38. For this purpose, the piston 40 is provided with two series of ports 42 and 43. The flow of fluid through the inner series of ports 42 is controlled by a laminated pressure relief valve 44 clamped to the bottom of the piston by means of a coil spring 45 having the upper end abutting the relief valve, and having the lower end engaging a nut 46. The nut 46 is carried by the lower end of the piston rod 41 for adjustment axially of the latter to vary the compression of the spring 45 and thereby regulate the pressure at which the valve 44 opens. The construction is such that the valve 44 restricts to a substantial extent the flow of fluid downwardly through the ports 42 upon upward movement of the piston.

The flow of fluid upwardly through the outer series of ports 43 upon downward movement of the piston 40 is restricted to a lesser extent by a check valve 47 suitably clamped to the top of the piston 40. The check valve 47 prevents the flow of fluid through the ports 43 upon upward movement of the piston and is suitably apertured to enable the fluid to enter the inner series of ports as the piston travels upwardly in the cylinder.

Due to the fact that the piston rod 41 moves to a greater or lesser extent into and out of the cylinder 38 as the piston 40 reciprocates in the cylinder, it is necessary to compensate for the displacement of this rod. Thus, as the piston 40 moves downwardly, the excess fluid resulting from the displacement of the piston rod 41 is discharged into the reserve chamber 39 and fluid from the reserve chamber is admitted to the cylinder to replenish the latter when the piston, together with the rod, is moved upwardly. The flow of fluid between the reserve chamber and cylinder is controlled by a valve assembly 48 secured in the bottom of the cylinder 38. This valve assembly has a central opening 49 and has a plurality of ports 50 surrounding the central opening 49. The opening 49 is normally closed by a check valve 51 and the ports 50 are normally closed by a laminated pressure relief valve 52.

The above construction is such that as the piston 40 moves upwardly in the cylinder 38, fluid medium from the reserve chamber 39 flows through the central opening 49 into the lower end of the cylinder to replenish the fluid in the latter. The valve 51 for the central opening opens relatively freely and affords very little resistance to the return flow of fluid into the cylinder. On the other hand, when the piston moves downwardly in the cylinder, fluid is by-passed through the ports 50 to the reserve chamber and the valve 52 controlling the ports restricts to a much greater extent the flow of fluid from the cylinder to the reserve chamber. Thus it will be noted that the shock absorber acts to dampen the rebound action of the coil spring 21 and thereby improves the riding characteristics of the vehicle, especially when the latter is moved over rough ground.

What we claim as our invention is:

1. A seat assembly for a vehicle comprising a single beam pivotally supported at one end in such a manner as to be capable of swinging in a vertical plane only, a seat mounted on the beam adjacent the free end thereof, a conical spring positioned beneath the seat in the path of swinging movement of the beam, means anchoring one end of the spring on the beam and adapted to anchor the opposite end on a support enabling relative shifting movement of opposite ends of the spring to compensate for the arcuate path of travel of the seat, and shock absorbing means connected to said beam and adapted to be connected to a vehicle stationary member for controlling the action of the spring.

2. A seat assembly for a vehicle comprising a single beam pivotally supported at one end in such a manner as to be capable of swinging in a vertical plane only, a seat mounted on the beam adjacent the free end thereof, a conical spring positioned beneath the seat in the path of swinging movement of the beam, means anchoring one end of the spring on the beam and adapted to anchor the opposite end on a support enabling relative shifting movement of opposite ends of the spring to compensate for the arcuate path of travel of the seat, and a tubular shock absorber also positioned in the path of swinging movement of the beam and having one end connected to a part movable with the beam and the opposite end adapted to be connected to a support.

3. A seat assembly for a vehicle comprising a single beam pivotally supported at one end in such a manner as to be capable of swinging in a vertical plane only, a seat mounted on said beam adjacent to the rear end thereof, a conical coil spring disposed beneath said seat and beam with its apex at the lower end adapted to engage a stationary support in said vertical plane of the beam, and a shock absorber disposed in the vertical plane of the beam with its upper end connected to said beam and with its lower end adapted to be connected to a support.

4. A seat assembly for a vehicle comprising a single beam pivotally supported at one end in such a manner as to be capable of swinging in a vertical plane only, a seat mounted on said beam adjacent the free end thereof, a spring seat secured to said beam adjacent to the free end thereof, a conical coil spring having its upper end engaging said spring seat and its lower apex end adapted to engage a support in said vertical plane of the beam, and a shock absorber disposed in substantially the vertical plane of the beam and having its upper end connected to said beam and its lower end adapted to be connected to a support.

5. A seat assembly for a vehicle comprising a single beam pivotally supported at one end in such manner as to be capable of swinging in a vertical plane only, a member secured to said beam adjacent the free end thereof and extending above and below the same, a seat adjustably mounted on the upper portion of said member, a spring seat connected to the lower portion of said member beneath said beam, a conical coil spring having its large end engaging said spring seat and its lower apex end adapted to engage a support in said vertical plane of the beam, and a shock absorber disposed substantially in said vertical beam plane and having its upper end connected to said beam and its lower end adapted to be connected to a support.

6. A seat assembly for a vehicle comprising a single beam pivotally supported at one end so as to be capable of swinging in a vertical plane only, a seat mounted on said beam adjacent the free end thereof, a conical coil spring disposed beneath said seat and beam and having its apex at the lower end thereof adapted to engage a support, and a vertically extending shock absorber having its upper end attached to said beam and having its lower end adapted to be connected to a support, said beam, apex of said spring and shock absorber all being located in substantially the same vertical plane.

7. A seat assembly for a vehicle including a single beam, a member secured to one end of said beam and extending laterally with respect thereto, means for pivotally connecting said member to a vehicle at laterally spaced points so that said member can pivot only in a vertical plane, a seat mounted on said beam adjacent the free end thereof, a spring seat secured to the underside of said beam below said seat, a conical coil spring having its large end engaging said spring seat with its lower apex end adapted to engage a support in said vertical plane so that the opposite ends of said spring will be anchored thereby enabling relative shifting movement of said opposite spring ends to compensate the arcuate path of travel of the seat, and a tubular shock absorber also positioned substantially in the path of swinging movement of the beam and having one end secured to the beam and the opposite end adapted to be secured to a support for dampening the rebound motion of said spring.

8. A seat assembly for a vehicle including a single beam, means forming a laterally elongated bearing adapted to be connected to a fixed portion of a vehicle at laterally spaced points and connected to one end of said beam so as to pivotally support said beam for swinging movement in a vertical plane only, a seat mounted on said beam adjacent to the free end thereof, a conical coil spring disposed beneath said seat and beam with its apex at the lower end adapted to engage a support in the vertical plane of said beam, and a shock absorber disposed in said vertical beam plane and having its upper end connected to said beam and its lower end adapted to be connected to a support.

9. A seat assembly for a vehicle including a single beam, means forming a laterally elongated bearing connected to one end of said beam and adapted to be connected to a vehicle support at laterally spaced points so that said member and beam can pivot in a vertical plane only, a member secured to said beam adjacent the free end thereof and extending above and below said beam, a seat adjustably mounted on the upper portion of said member, a spring seat connected to the lower portion of said member beneath said beam, a conical coil spring having its large end engaging said spring seat with its lower apex end adapted to engage a support in said vertical plane so that the opposite ends of said spring are anchored thereby enabling relative shifting movement of said opposite spring ends to compensate for the arcuate path of travel of the seat, and a tubular shock absorber also positioned substantially in the path of swinging movement of the beam and having its upper end connected to said beam and its lower end adapted to be connected to a support so as to dampen the rebound motion of said spring.

GLEN L. WHITE.
CLAYTON H. DIEDRICH.

REFERENCES CITED

The following references are of record in the file of this patent:

UNITED STATES PATENTS

| Number | Name | Date |
| --- | --- | --- |
| 817,682 | Werner | Apr. 10, 1906 |
| 1,058,655 | Bates et al. | Apr. 8, 1913 |
| 1,229,488 | Lindskvog | June 12, 1917 |
| 1,411,372 | Olson et al. | Apr. 4, 1922 |
| 1,747,932 | Dufaux | Feb. 18, 1930 |
| 1,777,463 | Dearing | Oct. 7, 1930 |
| 2,162,476 | Casper | June 13, 1939 |
| 2,284,352 | Zank | May 26, 1942 |

FOREIGN PATENTS

| Number | Country | Date |
| --- | --- | --- |
| 556,818 | France | Apr. 20, 1923 |